US005123291A

United States Patent [19]

Sonntagbauer

[11] Patent Number: 5,123,291

[45] Date of Patent: Jun. 23, 1992

[54] SNAP-ACTION SPRING DRIVE FOR LOAD-REVERSING SWITCHES OF MULTIPLE CONTACT SWITCHES

[75] Inventor: Ernst Sonntagbauer, Wien, Austria

[73] Assignee: Elin-Union Aktiengesellschaft fur Elektrische Industrie, Wein, Austria

[21] Appl. No.: 474,841

[22] PCT Filed: Mar. 14, 1989

[86] PCT No.: PCT/AT89/00029

§ 371 Date: Sep. 18, 1990

§ 102(e) Date: Sep. 18, 1990

[87] PCT Pub. No.: WO89/08924

PCT Pub. Date: Sep. 21, 1989

[30] Foreign Application Priority Data

Mar. 18, 1988 [AT] Austria ............................... A739/88

[51] Int. Cl.[5] ...................... B23Q 11/16; F16H 21/44; F16H 27/00

[52] U.S. Cl. ......................................... 74/2; 74/97.1; 74/112; 200/400

[58] Field of Search ........................... 74/2, 97.1, 112; 200/400

[56] References Cited

U.S. PATENT DOCUMENTS 2,995,043 8/1961 Lusk et al. .......................... 74/97.1
3,211,870 10/1965 Lusk et al. ...................... 74/97.1 X
4,798,922 1/1989 Roberts ......................... 74/100.1 X

FOREIGN PATENT DOCUMENTS 759740 10/1956 United Kingdom .
893287 4/1962 United Kingdom .

OTHER PUBLICATIONS

International Search Report PCT/AT89/00029.
Annex to the International Search Report PCT/AT89/00029.

*Primary Examiner*—Allan D. Herrmann
*Assistant Examiner*—David W. Laub
*Attorney, Agent, or Firm*—Sandler, Greenblum & Bernstein

[57] ABSTRACT

Snap-action spring device for load-reversing switches of multiple contact switches whose spring can be loaded by a drive. In conventional load-reversing switches, a gear moves a cam disk to and fro between two end positions, so that the contacts which close last during the movement in one direction are the first to open during the reverse movement and vice versa. This rigid sequence of contacts is unsuitable for thyristor load-reversing switches. The invention proposes that the driven element be connected to a coupling element which can rotate in one direction only independently of the direction of rotation of the drive. This permits automatic contact sequence control and precludes switching errors, in a simpler manner.

10 Claims, 2 Drawing Sheets

SNAP-ACTION SPRING DRIVE FOR LOAD-REVERSING SWITCHES OF MULTIPLE CONTACT SWITCHES

BACKGROUND OF THE INVENTION

1. Field of the Invention

The invention relates to a snap-action spring drive for load-reversing switches of multiple contact switches, which includes a storing spring that can be loaded by a drive having a shaft which rotates either clockwise or counterclockwise, and an element for controlling the contact movement, which preferably is a cam disk or a connecting link control and is driven during the reversing process by the storing spring, performs a rotational movement.

2. Discussion of the Background Information

Conventional load-reversing switches for multiple contact switches of voltage regulating transformers have a resistance quick throw-over switch having switch contact shafts which are controlled by means of a cam disk drive driven by an energy storage device. In this connection, the cam disk is moved from one end position to another, and back again by a back and forth movement, regardless of the particular direction of movement of the selector. This means that the contacts which last closed during the movement of the cam drive in one direction open first during the reverse movement, or that the contacts which first opened during the movement in one direction close last during the reverse movement.

This rigid contact sequence during the load-reversing operation is unsuitable for thyristor load-reversing switches.

SUMMARY OF THE INVENTION

It is therefore an object of the invention to provide a switching mechanism which permits the control of loadreversing and auxiliary contacts as well as magnetic triggers, the sequence of movement of which is different in relation to the main contact movement during the opening and closing operation.

This object is attained by the apparatus of the invention. It is characterized in that the storing spring and the driven element are connected with a coupling element which can only be rotated in one direction, independent of the direction of rotation of the drive.

By means of the invention it is possible to perform the control of contact sequences in a simple manner and to safely avoid switching errors.

A further development of the invention resides in the fact that end positions of the coupling element are offset by 180° in with respect to each other. Jolt-free switching to both halves of the applied program disks is thereby assured.

In accordance with an embodiment of the invention, a movable stop is provided in connection with each end position, in which a detent present on the coupling element can be latched after each switching operation. Exact initial and end positions of applied program disks are thereby attained.

In accordance with a further characteristic of the invention, a fastening pin connected with the storing spring is provided on the diametrical line of the coupling element which originates at the detent, where the distance between the detent and the fastening pin is greater than the radius of the coupling element.

This results in a very advantageous point of application of force of the storing spring on the coupling element.

In a development of the invention, the storing spring can only be loaded in one direction. This results in the advantage of an uncomplicated, and thus particularly operationally safe design.

In accordance with a further embodiment, the loading of the storing spring is performed by means of an electric motor provided within the switch housing and acting directly on a drive shaft. The advantage here is that increased dependability is attained because of the reduced number of components.

DETAILED DESCRIPTION OF THE PREFERRED EMBODIMENTS

Figure 1:
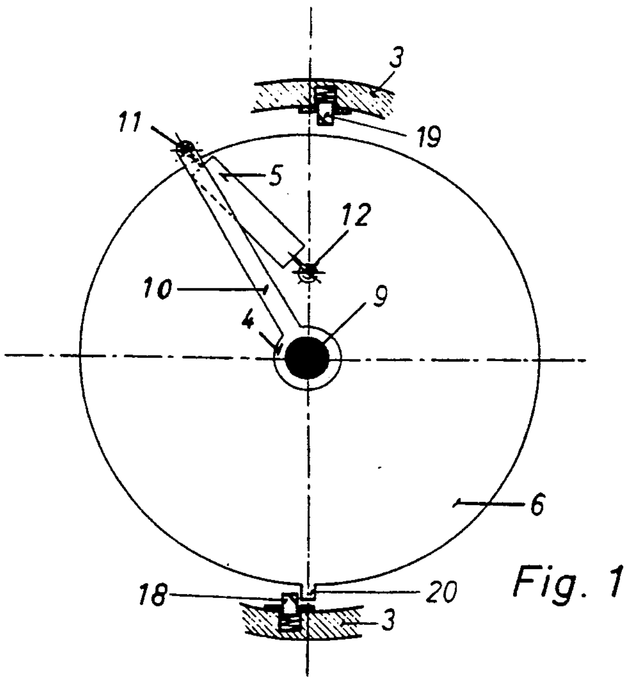
FIG. 1 illustrates a top view of a coupling element according to the invention.

In FIG. 1, coupling element 6 is in the form of a circular disk, on the outer periphery of which a fixed detent 20. Two displaceable stops 18, 19 are associated with the detent 20, which are fixed, offset by the 180° rotational angle, in a switch housing 3.

The fastening pin 12 for the storing spring 5 is positioned on the diametrical line of the coupling element 6 originating at the detent 20, and the distance between the detent 20 and the fastening pin 12 is greater than the radius of the coupling element 6.

If the load switch is in an end position, the displaceable stops 18, 19 prevent any rotation of the coupling element 6. In the initial position shown in FIG. 1 this is the stop 18 which abuts against the detent 20, thereby blocking the coupling element 6.

Figure 2:
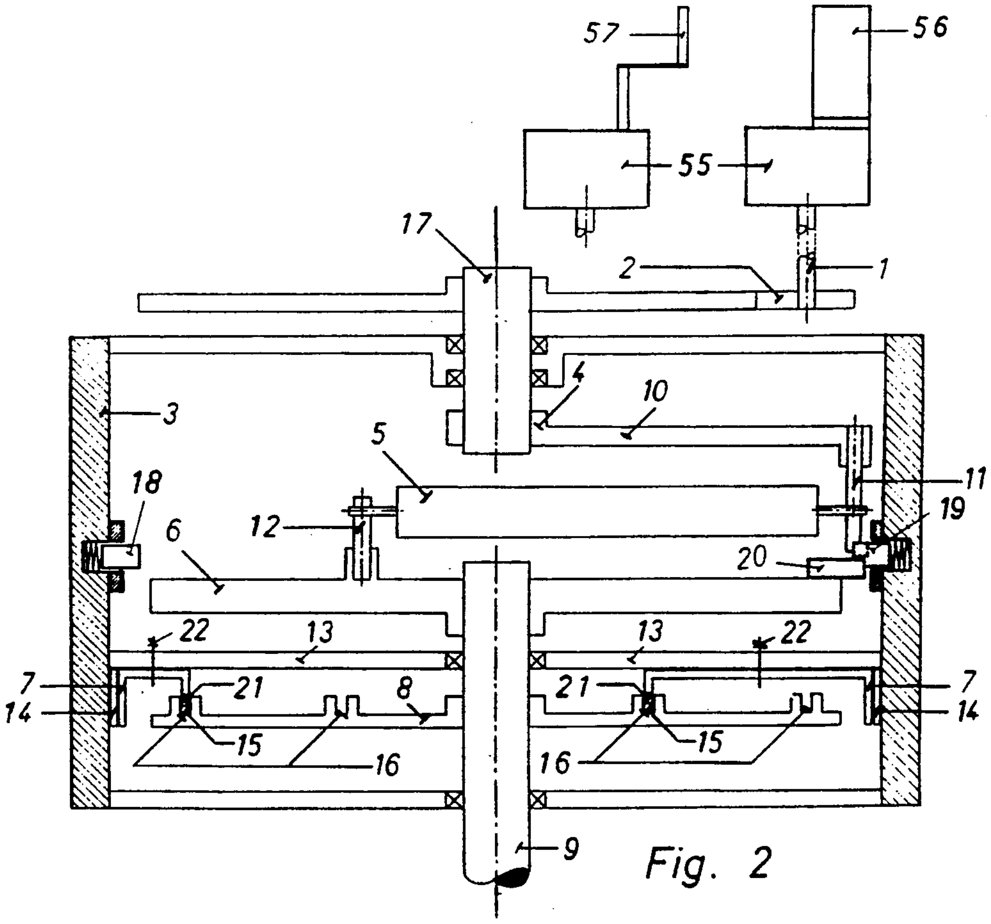
FIG. 2 illustrates a switching mechanism in sectional view, in which the coupling element shown in FIG. 1 is used.

FIG. 2 shows a cylindrical switch housing 3, closed on all sides, which is separated into an upper and a lower housing section by a housing partition 13.

A switch shaft 9 rests vertically and centered in the lower part, and has an end extending into the upper part, on which the coupling element 6 is placed. The switch shaft 9 is seated by means of ball bearings in the housing floor and the housing partition 13.

As activating element for the snap-action spring drive, a gear casing 55 either with a motor 56 or a hand crank 57 is provided outside the switch housing. From this activating element, a drive shaft 1 acts on reduction gear 2 disposed, outside of the switch housing 3. The reduction gear 2 is driven to slowly rotate connecting shaft 17, which shift is seated in the housing lid, and has an extending shaft stub into the upper part of the switch housing 3. A load crank 10 is placed on this shaft stub, the fastening pin 11 of which connects a storing spring 5 with a fastening pin 12 placed on the coupling element 6.

A program disk 8 has been placed on the switch shaft 9 in the lower housing part, and is rigidly connected by it with the coupling element 6 in the upper housing part.

If the drive shaft 1 is turned counterclockwise by means of the activating element, i.e. the gear casing 55 either with a motor 56 or a hand crank 57, a clockwise rotational movement of the connecting shaft 17 takes place via the reduction gear 2.

The rotation of the connecting shaft 17 causes movement of the load crank 4 which in turn loads the storing spring 5 of the coupling element 6. The fastening pin acts simultaneously as activating device for both displaceable stops 18 and 19.

In the course of this, the load crank 4 moves the storing spring 5 clockwise around the angle of rotation by 180°. If the displaceable stop 18 activated by the fastening pin 11 releases detent 20, the coupling element rotates in a clockwise direction. The coupling element 6 rotates until the other end position, fixed by the second movable stop 19, has been attained. This stop 19 and the detent 20 now prevent further rotation of the coupling element 6.

If the activating element turns the drive shaft 1 clockwise, a counterclockwise rotational movement of the connecting shaft 17 takes place via the reduction gear 2.

The rotation of the connecting shaft 17 causes a movement of the load crank 4, which loads the storing spring 5. In the course of this, the load crank 4 moves the storing spring 5 counterclockwise around the angle of rotation by 180°. If, by unlocking the detent 20, the movable stop 19 frees the coupling element 6, the latter again rotates clockwise. The coupling element 6 rotates until the first, original initial position, fixed by the movable stop 19, has been attained.

Thus, the coupling element 6 always rotates only clockwise after having been released by the movable stops 18 and 19, independently of whether the storing spring 5 was loaded clockwise or counterclockwise by the rotation of the load crank 4.

The program disk 8 in FIG. 2 has two program grooves 16 which correspond to the circumference of cam disks. Movable, right-angled contact pieces 7 are provided in the switch housing 3 the longer legs of which are seated in the housing partition 13 by means of a shaft 22, and the shorter leg of which are provided as a counterpiece of a fixed contact piece 14, disposed in the housing interior.

A guide roller 15 glides in each program groove 16 and acts via a hinge 21 on the leg of the contact piece 7 seated in the housing partition 13.

It is also possible to provide the program disk 8 with more program grooves 16 than illustrated in this embodiment or to provide grooves on both sides.

Figure 4:
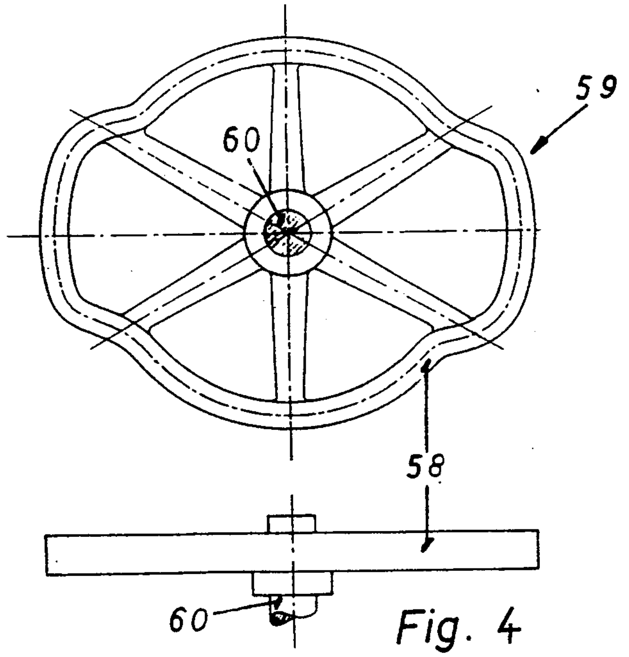
FIG. 4 illustrates the principle of a link motion in an elevational and lateral view.

A further possibility of increasing the number of switch programs consists in placing a plurality of program disks 8 on the switch shaft 9. Another variant for the execution of switch programs consists of, as shown in FIG. 4, using a link motion instead of a program disk. The function of the program groove 16 represented in FIG. 2 is thereby replaced by the special shape of the circumference 59 of a gear casing 58, which is mounted on an axis 60.

Figure 3:
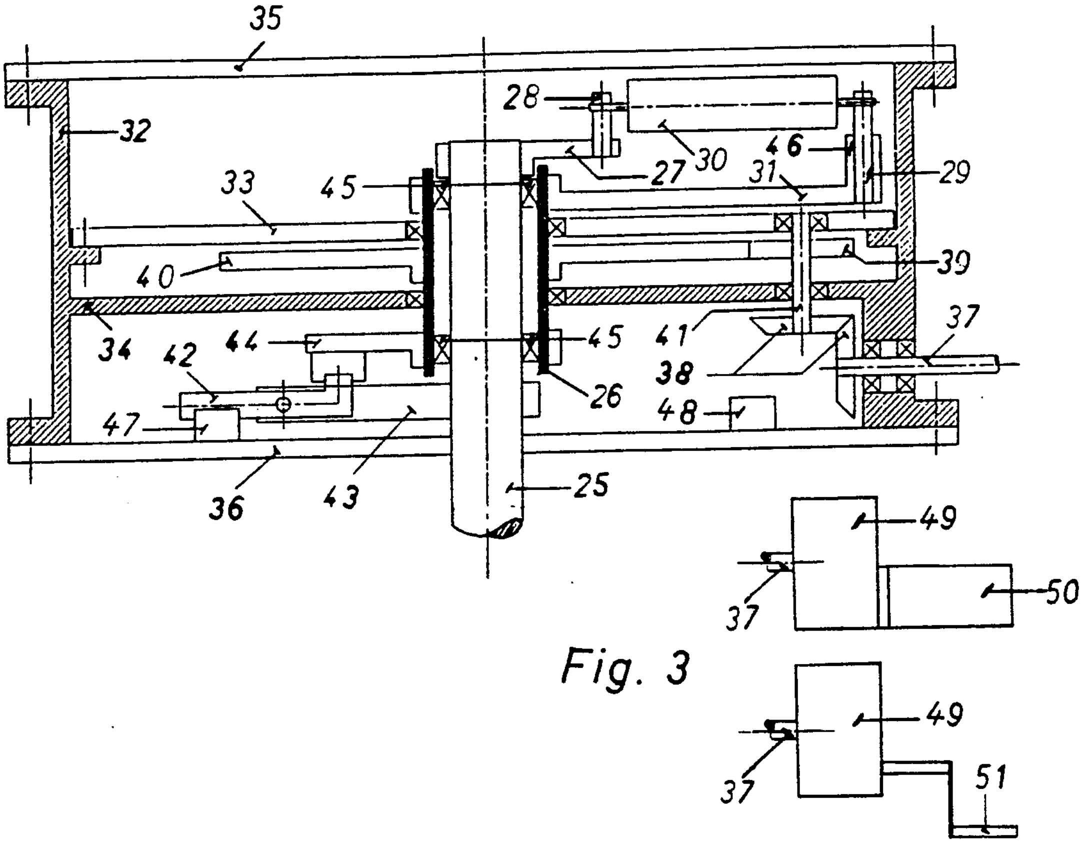
FIG. 3 illustrates a second embodiment of a switching mechanism according to the invention in sectional view, where the coupling element and the detent device are spatially separated.

In FIG. 3, a cylindrical switch housing 32 is enclosed on all sides by means of an upper cover 35 and a lower cover 36, and is divided by means of a housing partition 34 and a housing partition plate 33 into upper, central and lower housing sections. A solid shaft 25 extends from the outside in a vertical and centered position through the lower cover 36, as well as the housing partition 34, and the housing partition plate 33 as far as the upper housing section. Two needle bearings 45 have been placed on the solid shaft 25, and a hollow shaft 26 is pushed on it which extends from the lower to the upper housing section.

The solid shaft 25 extends further into the upper housing section than the hollow shaft 26 and is rigidly connected there with a coupling element 27. Also located in this housing section is a load crank 31 with a short pin holder 46 set off at a 90° angle, into which a fastening pin 29 has been inserted. The fastening pin is disposed parallel to the housing partition plate 33 and rigidly connected with the hollow shaft 26. A storing spring 30 is suspended between it and a further fastening pin 28, placed on the outer periphery of the coupling element 27.

A reduction gear is provided in the central housing section, the large toothed wheel 40 of which is rigidly connected with the hollow shaft 26, and the pinion 39 of which is seated on a driven shaft 41 seated in the housing partition 34 and the housing partition plate 33.

A gear casing 49 with either a motor 50 or a hand crank 51 is provided outside of the switch housing 32 as activating element of the snap-action spring drive. From this activating element, a drive shaft 37, seated with its one end in the wall of the switch housing 33, acts on a first bevel wheel disposed in the lower housing section, which is a part of an angular gear 38, the second bevel wheel of which is connected with the driven shaft 41.

A stop lever 43, with which a stop bracket 42 is movably connected, is also disposed parallel to the lower cover 36, as a part of a detent device in the lower housing section, and is rigidly connected with the solid shaft 25. A leaf spring, not shown in the drawing, acts on the stop bracket 42 in such a way that its longer leg is located parallel to the stop lever 43, and its shorter leg, at an angle of 90°, is parallel to the shafts 25 and 26. An unlocking lever 44 lies parallel to the housing partition 34, and has a rigid connection with the hollow shaft 26. Its downwardly pointing detent intersects with the shorter leg of the stop bracket 42. A detent 47 fastened on the lower cover intersects with the stop lever 43 of the detent device.

One or a plurality of program disks may be placed on the solid shaft 25 outside of the switch housing 32. This is not illustrated in the drawings.

If the load-reversing switch is in the end position shown in FIG. 3, the stop bracket 42 and the detent 47 prevent any turning of the solid shaft 25, and thus also of the coupling element 27 rigidly connected with it. The drive shaft 37 is turned by means of an activating element, i.e., a gear casing 49, either with a motor 50 or a hand crank 51 in such a way that (via the angular gear 38, the driven shaft 41 as well as the pinion 39 with the large toothed wheel 40 of the reduction gear) that the hollow shaft 26 moves clockwise, looking from above. The rotation of the hollow shaft 26 causes a movement of the load crank 31 rigidly connected with it, which in turn loads the storing spring 30 of the coupling element 27. In this case, the load crank 31 moves the storing spring 30 clockwise around an angle of rotation of 180°. At the same time the unlocking lever 44, rigidly connected with the hollow shaft 26, is also turned by the latter's rotation clockwise around an angle of rotation of 180° into the right half of the lower housing section.

If the detent device frees the solid shaft 25 by unlocking the stop bracket 42 from the detent 48, its rotation as well as that of the coupling element 27 rigidly connected with it takes place clockwise. The coupling element 27 and the solid shaft 25 rotate until the stop lever 43 with the stop bracket 42 has reached the second stop bracket 48 offset by an angle of rotation of 180°, which prevents further rotation of the coupling element 27 and the solid shaft 25.

If the activating element turns the hollow shaft 26 counterclockwise, looking from above, this causes a movement of the load crank 31, rigidly connected with it, which in turn loads the storing spring 30 of the coupling element 27. In this case the load crank 31 moves the storing spring 30 counterclockwise around an angle of rotation of 180°. Simultaneously the unlocking lever 44, rigidly connected with the hollow shaft 26, is also turned by the latter's movement counterclockwise into the left half of the lower housing section.

If the detent device frees the solid shaft 25 by unlocking the stop bracket 42 from the detent 48, its rotation as well as that of the coupling element 27 rigidly connected with it again takes place clockwise. The coupling element 27 and the solid shaft 25 rotate until the stop lever 43 with the stop bracket 42 has reached the first detent 47 offset by an angle of rotation of 180°, which prevents further rotation of the coupling element 27 and the solid shaft 25.

I claim:

1. A snap-action spring drive for load-reversing switches of multiple contact switches, comprising:

- a drive including a shaft which is capable of rotating clockwise or counterclockwise;
- a storing spring capable of being loaded by said drive;
- means for controlling contact movement which is driven by said storing spring during reverse rotation;
- a coupling element connecting said storing spring and said means for controlling, said coupling element being rotatable in only one direction, which direction is independent of the direction of rotation of said drive, said coupling element including a detent;
- means associated with said coupling element for stopping rotation of said drive at predetermined end positions; and
- a fastening pin connected with said storing spring is positioned on a diametrical line of said coupling element, which diametrical line originates at said detent, and said fastening pin is spaced from said detent a distance which is greater than the radius of the coupling element.

2. The snap-action spring drive according to claim 1, wherein said predetermined end positions are offset from each other by 180°.

3. The snap-action spring drive according to claim 2, wherein a movable stop is located at each end position for latching with said detent after each switching operation.

4. The snap-action spring drive according to claim 3, wherein said storing spring is loadable in only one direction.

5. The snap-action spring drive according to claim 4, further comprising an electric motor acting directly on said shaft.

6. The snap-action spring drive according to claim 1, wherein a movable stop is located at each end position for latching with said detent after each switching operation.

7. The snap-action spring drive according to claim 1, wherein said storing spring is loadable in only one direction.

8. The snap-action spring drive according to claim 1, further comprising an electric motor directly on said shaft.

9. The snap-action spring device according to claim 1, wherein said means for controlling comprise a cam disk.

10. The snap-action spring drive according to claim 1, wherein said means for controlling comprise a connecting link control.

* * * * *